(12) United States Patent
Rios Acebal et al.

(10) Patent No.: US 11,585,038 B2
(45) Date of Patent: Feb. 21, 2023

(54) LAUNDRY TREATING APPLIANCE WITH A FILTER

(71) Applicant: WHIRLPOOL CORPORATION, Benton Harbor, MI (US)

(72) Inventors: Marcos Javier Rios Acebal, Monterrey (MX); Arun Rajendran, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 281 days.

(21) Appl. No.: 16/690,434

(22) Filed: Nov. 21, 2019

(65) Prior Publication Data

US 2021/0156070 A1    May 27, 2021

(51) Int. Cl.
| | |
|---|---|
| *D06F 39/10* | (2006.01) |
| *D06F 58/22* | (2006.01) |
| *D06F 58/24* | (2006.01) |
| *D06F 25/00* | (2006.01) |

(52) U.S. Cl.
CPC .............. *D06F 39/10* (2013.01); *D06F 25/00* (2013.01); *D06F 58/22* (2013.01); *D06F 58/24* (2013.01)

(58) Field of Classification Search
CPC .......... D06F 58/22; D06F 58/24; D06F 58/45; D06F 25/00; D06F 39/10; D06F 2105/34
See application file for complete search history.

(56) References Cited

U.S. PATENT DOCUMENTS

| | | | |
|---|---|---|---|
| 7,020,986 B1* | 4/2006 | Nakai | D06F 58/22 34/596 |
| 7,681,420 B2 | 3/2010 | Jeong et al. | |
| 8,024,948 B2 | 9/2011 | Kitamura et al. | |
| 8,800,165 B2 | 8/2014 | Kwon et al. | |
| 9,027,256 B2 | 5/2015 | Kim et al. | |
| 9,194,073 B2 | 11/2015 | Kwon et al. | |
| 9,200,837 B2 | 12/2015 | Kwon et al. | |
| 9,255,353 B2 | 2/2016 | Kwon et al. | |
| 9,441,883 B2 | 9/2016 | Kim et al. | |
| 9,828,715 B2 | 11/2017 | Kwon et al. | |
| 2006/0075577 A1 | 4/2006 | Jeong et al. | |
| 2010/0175432 A1* | 7/2010 | Komori | D06F 25/00 68/20 |
| 2013/0139402 A1 | 6/2013 | Hong | |

(Continued)

FOREIGN PATENT DOCUMENTS

| | | |
|---|---|---|
| CN | 105088703 A | 11/2015 |
| CN | 109112804 A | 1/2019 |

(Continued)

OTHER PUBLICATIONS

EP0395484—Machine Translation (Year: 1990).*

(Continued)

*Primary Examiner* — Marc Lorenzi
(74) *Attorney, Agent, or Firm* — McGarry Bair PC

(57) ABSTRACT

A laundry treating appliance comprising a tub with a tub access opening, a rotatable drum located within the tub and partially defining a treating chamber, a drying air duct having an inlet formed in the tub and defining a cross-sectional area of the inlet, and a filter overlying the inlet and having a surface area greater than the cross-sectional area of the drying air duct.

11 Claims, 17 Drawing Sheets

(56) References Cited

U.S. PATENT DOCUMENTS

| | | | | |
|---|---|---|---|---|
| 2013/0263630 A1* | 10/2013 | Doh | ........................ | D06F 37/04 |
| | | | | 68/20 |
| 2015/0144748 A1* | 5/2015 | John | ........................ | D06F 58/22 |
| | | | | 248/94 |
| 2017/0350063 A1 | 12/2017 | Bombardieri | | |
| 2017/0350065 A1 | 12/2017 | Bombardieri | | |

FOREIGN PATENT DOCUMENTS

| | | | | |
|---|---|---|---|---|
| EP | 0395484 A1 * | 10/1991 | ............. | D06F 58/22 |
| EP | 2669417 A1 | 12/2013 | | |
| EP | 3162940 A1 | 5/2017 | | |
| EP | 3132081 B1 | 3/2019 | | |
| KR | 100761135 B1 | 9/2007 | | |
| KR | 20120108168 A | 10/2012 | | |
| KR | 20180027298 A | 3/2018 | | |
| WO | 2010137910 A2 | 12/2010 | | |
| WO | 2015101892 A1 | 7/2015 | | |

OTHER PUBLICATIONS

KR20180027298—Machine Translation (Year: 2018).*
European Search Report for Counterpart EP20208240.0, dated Feb. 16, 2021.

* cited by examiner

LAUNDRY TREATING APPLIANCE WITH A FILTER

BACKGROUND

Laundry treating appliances, such as clothes washers, clothes dryers, combination washer/dryers, refreshers, and non-aqueous systems, can have a configuration based on a rotating drum, located within a tub, which is located within a cabinet. The drum defines a treating chamber having an access opening and the cabinet has a corresponding opening. An annular bellow can extend between the cabinet opening and the tub and/or drum.

A filter can be placed in an air flow circuit providing air to the drum in order to aid in the capture, or reduction of lint from the circulating fluid flow within the laundry treating appliance. The filter ensures that lint is collected at a central location and not passed through various components of the laundry treating appliance used during the drying phase (e.g., blowing fans, heaters, condensers, etc.). During operation, lint can accumulate on the filters. This lint accumulation can negatively affect performance of the laundry appliance, specifically during drying phases. The lint can, for example, accumulate at an inlet of the drying air duct (e.g., inlet of a recirculation system, or blower) and restrict the airflow from the tub to the drying air duct, therefore, reducing the drying efficiency of the laundry treating appliance.

BRIEF SUMMARY

In one aspect, the present disclosure relates to a combination washer/dryer comprising, a tub at least partially defining a tub interior with a tub access opening, a rotatable drum located within the tub interior and at least partially defining a treating chamber with a treating chamber access opening, a drying air duct having an inlet formed in the tub and defining a cross-sectional area at the inlet, and a filter having a front face overlying the inlet and having a surface area greater than the cross-sectional area.

In another aspect, the present disclosure relates to a laundry treating appliance comprising, a tub at least partially defining a tub interior with a tub access opening, a rotatable drum located within the tub interior and at least partially defining a treating chamber with a treating chamber access opening, and a filter having a front face overlying an inlet formed within a surface of the drum, the inlet having a cross-sectional area smaller than the surface area of the filter.

DETAILED DESCRIPTION

Aspects of the present disclosure relate to a filter disposes at an inlet of a drying air duct. The drying air duct can be a recirculation duct which can recirculate the air back into the drum, or it can be an air duct which leads to an exterior portion of the laundry treating appliance. The filter can be used in any type of laundry treating appliance needing to dry laundry, such laundry treating appliances can be a clothes dryer or a combination washer/dryer (combo).

In traditional combination washing and drying machines, drying air can be delivered to the tub interior near a bellows in a radial direction. However, this can result in an excess of lint building being built up around a chassis opening of the laundry treating appliance. The present disclosure sets forth a laundry treating appliance having an annular bellows that can direct drying air through a deflection component, which in turn can induce at least a portion of the drying air into a circumferential airflow. This directional airflow has been found to dramatically reduce the accumulation of lint around portions of the chassis opening.

Figure 1:
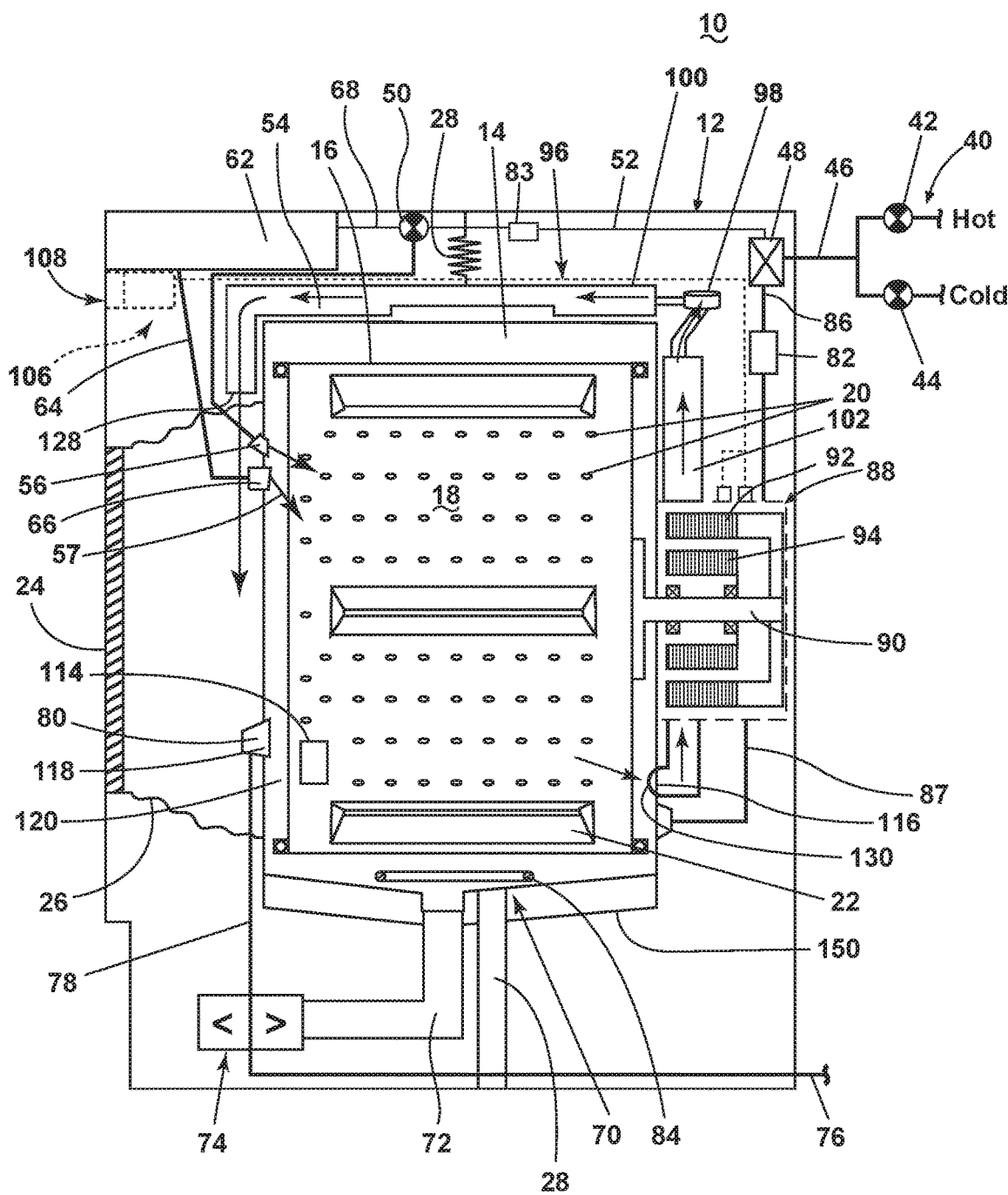
FIG. 1 illustrates a schematic cross-sectional view of a laundry treating appliance in the form of a combination washing and drying machine including a filter according to an aspect of the present disclosure.

FIG. 1 is a schematic cross-sectional view of a laundry treating appliance according to an aspect of the present disclosure. The laundry treating appliance can be any appliance which performs an automatic cycle of operation to clean or otherwise treat items placed therein, non-limiting examples of which include a horizontal or vertical axis clothes washer; a combination washing machine and dryer; a tumbling or stationary refreshing/revitalizing machine; an extractor; a non-aqueous washing apparatus; and a revitalizing machine. While the laundry treating appliance is illustrated herein as a horizontal axis, front-load laundry treating appliance, the aspects of the present disclosure can have applicability in laundry treating appliances with other configurations.

Washing machines are typically categorized as either a vertical axis washing machine or a horizontal axis washing machine. The terms vertical axis and horizontal axis are often used as shorthand terms for the manner in which the appliance imparts mechanical energy to the load of laundry, even when the relevant rotational axis is not absolutely vertical or horizontal. As used herein, the "vertical axis" washing machine refers to a washing machine having a rotatable drum, perforate or imperforate, that holds fabric items and a clothes mover, such as an agitator, impeller, nutator, and the like within the drum. The clothes mover moves within the drum to impart mechanical energy directly to the clothes or indirectly through wash liquid in the drum. The clothes mover can typically be moved in a reciprocating rotational movement. In some vertical axis washing machines, the drum rotates about a vertical axis generally perpendicular to a surface that supports the washing machine. However, the rotational axis need not be vertical. The drum can rotate about an axis inclined relative to the vertical axis.

As used herein, the "horizontal axis" washing machine refers to a washing machine having a rotatable drum, perforated or imperforate, that holds laundry items and washes the laundry items. In some horizontal axis washing machines, the drum rotates about a horizontal axis generally parallel to a surface that supports the washing machine. However, the rotational axis need not be horizontal. The drum can rotate about an axis inclined or declined relative to the horizontal axis. In horizontal axis washing machines, the clothes are lifted by the rotating drum and then fall in response to gravity to form a tumbling action. Mechanical energy is imparted to the clothes by the tumbling action formed by the repeated lifting and dropping of the clothes. Vertical axis and horizontal axis machines are best differentiated by the manner in which they impart mechanical energy to the fabric articles.

Regardless of the axis of rotation, a washing machine can be top-loading or front-loading. In a top-loading washing machine, laundry items are placed into the drum through an access opening in the top of a cabinet, while in a front-loading washing machine laundry items are placed into the drum through an access opening in the front of a cabinet. If a washing machine is a top-loading horizontal axis washing machine or a front-loading vertical axis washing machine, an additional access opening is located on the drum.

The exemplary laundry treating appliance of FIG. 1 is illustrated as a horizontal axis combination washing and drying machine 10, which can include a structural support system comprising a cabinet 12 which defines a housing within which a laundry holding system resides. While illustrated as a combination washing and drying machine 10 it should be understood that the method as described herein can be implemented in a stand-alone washing machine or a stand-alone dryer. The cabinet 12 can be a housing having a chassis and/or a frame, to which decorative panels can or cannot be mounted, defining an interior enclosing component typically found in a conventional washing machine, such as motors, pumps, fluid lines, controls, sensors, transducers, and the like. Such components will not be described further herein except as necessary for a complete understanding of the present disclosure.

The laundry holding system comprises a tub 14 dynamically suspended within the structural support system of the cabinet 12 by a suitable suspension system 28 and a drum 16 provided within the tub 14, the drum 16 defining at least a portion of a treating chamber 18. The drum 16 is configured to receive a laundry load comprising articles for treatment, including, but not limited to, a hat, a scarf, a glove, a sweater, a blouse, a shirt, a pair of shorts, a dress, a sock, and a pair of pants, a shoe, an undergarment, and a jacket. The drum 16 can include a plurality of perforations 20 such that liquid can flow between the tub 14 and the drum 16 through the perforations 20. It is also within the scope of the present disclosure for the laundry holding system to comprise only one receptacle with the receptacle defining the treating chamber for receiving the load to be treated. At least one lifter 22 can extend from a wall of the drum 16 to lift the laundry load received in the treating chamber 18 while the drum 16 rotates.

The laundry holding system can further include a door 24 which can be movably mounted to the cabinet 12 to selectively close both the tub 14 and the drum 16. A bellows 26 can couple an open face of the tub 14 with the cabinet 12, with the door 24 sealing against the bellows 26 when the door 24 closes the tub 14.

The combination washing and drying machine 10 can further comprise a washing circuit which can include a liquid supply system for supplying water to the combination washing and drying machine 10 for use in treating laundry during a cycle of operation. The liquid supply system can include a source of water, such as a household water supply 40, which can include separate valves 42 and 44 for controlling the flow of hot and cold water, respectively. Water can be supplied through an inlet conduit 46 directly to the tub 14 or the drum 16 by controlling first and second diverter mechanisms 48 and 50, respectively. The diverter mechanisms 48, 50 can be a diverter valve having two outlets such that the diverter mechanisms 48, 50 can selectively direct a flow of liquid to one or both of two flow paths. Water from the household water supply 40 can flow through the inlet conduit 46 to the first diverter mechanism 48 which can direct the flow of liquid to a supply conduit 52. The second diverter mechanism 50 on the supply conduit 52 can direct the flow of liquid to a tub outlet conduit 54 which can be provided with a spray nozzle 56 configured to spray the flow of liquid 58 into the tub 14. In this manner, water from the household water supply 40 can be supplied directly to the tub 14. While the valves 42, 44 and the inlet conduit 46 are illustrated exteriorly of the cabinet 12, it will be understood that these components can be internal to the cabinet 12.

The combination washing and drying machine 10 can also be provided with a dispensing system for dispensing treating chemistry to the treating chamber 18 for use in treating the load of laundry according to a cycle of operation. The dispensing system can include a treating chemistry dispenser 62 which can be a single dose dispenser, a bulk dispenser, or an integrated single dose and bulk dispenser and is fluidly coupled to the treating chamber 18. The treating chemistry dispenser 62 can be configured to dispense a treating chemistry directly to the tub 14 or mixed with water from the liquid supply system through a dispensing outlet conduit 64. The dispensing outlet conduit 64 can include a dispensing nozzle 66 configured to dispense the treating chemistry into the tub 14 in a desired pattern and under a desired amount of pressure. For example, the dispensing nozzle 66 can be configured to dispense a flow or stream of treating chemistry into the tub 14 by gravity, i.e. a non-pressurized stream. Water can be supplied to the treating chemistry dispenser 62 from the supply conduit 52 by directing the diverter mechanism 50 to direct the flow of water to a dispensing supply conduit 68.

The treating chemistry dispenser 62 can include multiple chambers or reservoirs for receiving doses of different treating chemistries. The treating chemistry dispenser 62 can be implemented as a dispensing drawer that is slidably received within the cabinet 12, or within a separate dispenser housing which can be provided in the cabinet 12. The treating chemistry dispenser 62 can be moveable between a fill position, where the treating chemistry dispenser 62 is exterior to the cabinet 12 and can be filled with treating chemistry, and a dispense position, where the treating chemistry dispenser 62 are interior of the cabinet 12.

Non-limiting examples of treating chemistries that can be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The combination washing and drying machine 10 can also include a recirculation and drain system for recirculating liquid within the laundry holding system and draining liquid from the combination washing and drying machine 10. Liquid supplied to the tub 14 through tub outlet conduit 54 and/or the dispensing supply conduit 68 typically enters a space between the tub 14 and the drum 16 and can flow by gravity to a sump 70 formed in part by a lower portion of the tub 14. The sump 70 can also be formed by a sump conduit 72 that can fluidly couple the lower portion of the tub 14 to a pump 74. The pump 74 can direct liquid to a drain conduit 76, which can drain the liquid from the combination washing and drying machine 10, or to a recirculation conduit 78, which can terminate at a recirculation inlet 80. The recirculation inlet 80 can direct the liquid from the recirculation conduit 78 into the drum 16. The recirculation inlet 80 can introduce the liquid into the drum 16 in any suitable manner, such as by spraying, dripping, or providing a steady flow of liquid. In this manner, liquid provided to the tub 14, with or without treating chemistry can be recirculated into the treating chamber 18 for treating the load of laundry within.

The liquid supply and/or recirculation and drain system can be provided with a heating system which can include one or more devices for heating laundry and/or liquid supplied to the tub 14, such as a steam generator 82, an inline heater 83 and/or a sump heater 84. Liquid from the household water supply 40 can be provided to the steam generator 82 through the inlet conduit 46 by controlling the first diverter mechanism 48 to direct the flow of liquid to a steam supply conduit 86. Steam generated by the steam generator 82 can be supplied to the tub 14 through a steam outlet conduit 87. The steam generator 82 can be any suitable type of steam generator such as a flow through steam generator or a tank-type steam generator. Alternatively, the sump heater 84 can be used to generate steam in place of or in addition to the steam generator 82. In addition or alternatively to generating steam, the steam generator 82 and/or sump heater 84 can be used to heat the laundry and/or liquid within the tub 14 as part of a cycle of operation.

It is noted that the illustrated suspension system, liquid supply system, recirculation and drain system, and dispensing system are shown for exemplary purposes only and are not limited to the systems shown in the drawings and described above. For example, the liquid supply, dispensing, and recirculation and pump systems can differ from the configuration shown in FIG. 1, such as by inclusion of other valves, conduits, treating chemistry dispensers, sensors, such as water level sensors and temperature sensors, and the like, to control the flow of liquid through the combination washing and drying machine 10 and for the introduction of more than one type of treating chemistry. For example, the liquid supply system can include a single valve for controlling the flow of water from the household water source. In another example, the recirculation and pump system can include two separate pumps for recirculation and draining, instead of the single pump as previously described.

The combination washing and drying machine 10 also includes a drive system for rotating the drum 16 within the tub 14. The drive system can include a motor 88, which can be directly coupled with the drum 16 through a drive shaft 90 to rotate the drum 16 about a rotational axis during a cycle of operation. The motor 88 can be a brushless permanent magnet (BPM) motor having a stator 92 and a rotor 94. Alternately, the motor 88 can be coupled to the drum 16 through a belt and a drive shaft to rotate the drum 16, as is known in the art. Other motors, such as an induction motor or a permanent split capacitor (PSC) motor, can also be used. The motor 88 can rotate the drum 16 at various speeds in either rotational direction.

The motor 88 can rotate the drum 16 at various speeds in opposite rotational directions. In particular, the motor 88 can rotate the drum 16 at tumbling speeds wherein the fabric items in the drum 16 rotate with the drum 16 from a lowest location of the drum 16 towards a highest location of the drum 16, but fall back to the lowest location of the drum 16 before reaching the highest location of the drum 16. The rotation of the fabric items with the drum 16 can be facilitated by the at least one lifter 22. Typically, the force applied to the fabric items at the tumbling speeds is less than about 1G. Alternatively, the motor 88 can rotate the drum 16 at spin speeds wherein the fabric items rotate with the drum 16 without falling. The spin speeds can also be referred to as satellizing speeds or sticking speeds. Typically, the force applied to the fabric items at the spin speeds is greater than or about equal to 1G. As used herein, "tumbling" of the drum 16 refers to rotating the drum at a tumble speed, "spinning" the drum 16 refers to rotating the drum 16 at a spin speed, and "rotating" of the drum 16 refers to rotating the drum 16 at any speed.

The combination washing and drying machine 10 can further include a drying air duct 96 that can be a closed loop or an open loop circuit. A closed loop system is illustrated where the drying air duct 96 can include a blower 98, a condenser 100, and a heating element 102. The condenser 100 can be provided with a condenser drain conduit (not shown) that fluidly couples the condenser 100 with the pump 74 and the drain conduit 76. Condensed liquid collected within the condenser 160 can flow through the condenser drain conduit to the pump 74, where it can be provided to the recirculation and drain system. In an exemplary aspect, an inlet 116 of the drying air duct 96 can be provided adjacent an upper portion of the tub 14, though it will be understood that the inlet 116 of the drying air duct 96 need not be provided adjacent an upper portion of the tub 14, and can be provided at any suitable location adjacent the tub 14. It is further contemplated that an open loop circuit is implemented where air is heated, passes through the drum 16 and is exhausted out of the combination washing and drying machine 10, in which case a condenser 100 is not necessary. Drying air 104 can be introduced through the front of the drum 16 or via the back of the drum 16 via an outlet 128 as illustrated.

A filter 130 can overlay the inlet 116 such that the inlet 116 is fully covered by at least a portion of the filter 130. During operation of the combination washing and drying machine 10, lint from the treating chamber 18 can accumulate on at least a portion of the filter 130 such that the lint does not enter the drying air duct 96.

The combination washing and drying machine 10 also includes a control system for controlling the operation of the combination washing and drying machine 10 to implement one or more cycles of operation. The control system can include a controller 106 located within the cabinet 12 and a user interface 108 that is operably coupled with the controller 106. The user interface 108 can include one or more knobs, dials, switches, displays, touch screens and the like for communicating with the user, such as to receive input and provide output. The user can enter different types of information including, without limitation, cycle selection and cycle parameters, such as cycle options.

The controller 106 can include the machine controller and any additional controllers provided for controlling any of the components of the washing machine 10. For example, the controller 106 can include the machine controller and a motor controller. Many known types of controllers can be used for the controller 106. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), can be used to control the various components.

Figure 2:
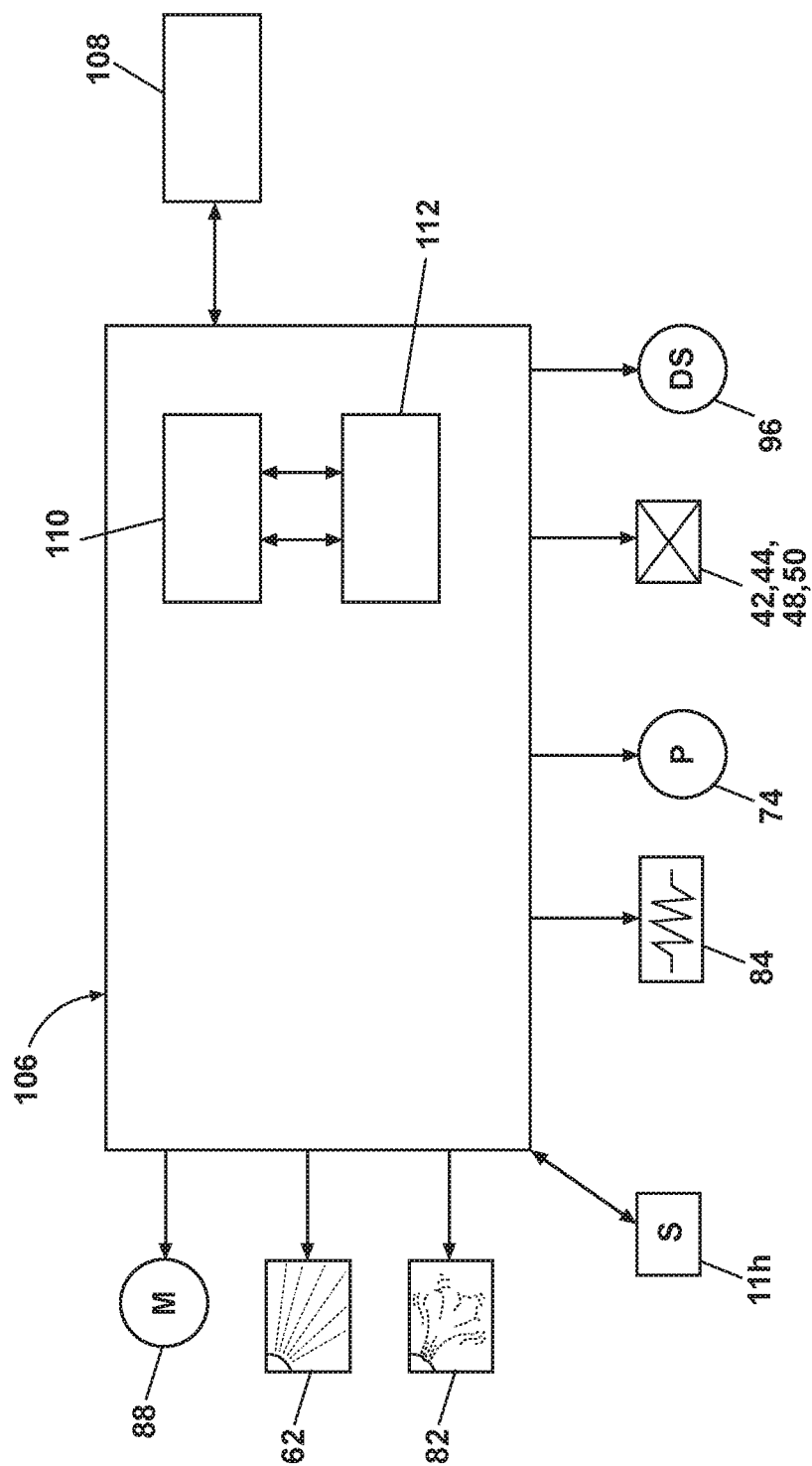
FIG. 2 illustrates a schematic of a control system of the laundry treating appliance of FIG. 1 according to an aspect of the present disclosure.

As illustrated in FIG. 2, the controller 106 can be provided with a memory 110 and a central processing unit (CPU) 112. The memory 110 can be used for storing the control software that is executed by the CPU 112 in completing a cycle of operation using the combination washing and drying machine 10 and any additional software. Examples, without limitation, of cycles of operation include: wash, heavy duty wash, delicate wash, quick wash, pre-wash, refresh, rinse only, and timed wash. The memory 110 can also be used to store information, such as a database or table, and to store data received from one or more components of the combination washing and drying machine 10 that can be communicably coupled with the controller 106. The database or table can be used to store the various operating parameters for the one or more cycles of operation, including factory default values for the operating parameters and any adjustments to them by the control system or by user input.

The controller 106 can be operably coupled with one or more components of the combination washing and drying machine 10 for communicating with and controlling the operation of the component to complete a cycle of operation. For example, the controller 106 can be operably coupled with the motor 88, the pump 74, the treating chemistry dispenser 62, the steam generator 82, the sump heater 84, and the drying air duct 96 to control the operation of these and other components to implement one or more of the cycles of operation.

The controller 106 can also be coupled with one or more sensors 114 provided in one or more of the systems of the washing machine 10 to receive input from the sensors, which are known in the art and illustrated in FIG. 1 in a lower portion of the treating chamber 18 for exemplary purposes only. Non-limiting examples of sensors 114 that can be communicably coupled with the controller 106 include: a treating chamber temperature sensor, a moisture sensor, a weight sensor, a chemical sensor, a position sensor and a motor torque sensor, which can be used to determine a variety of system and laundry characteristics, such as laundry load inertia or mass.

Figure 3A:
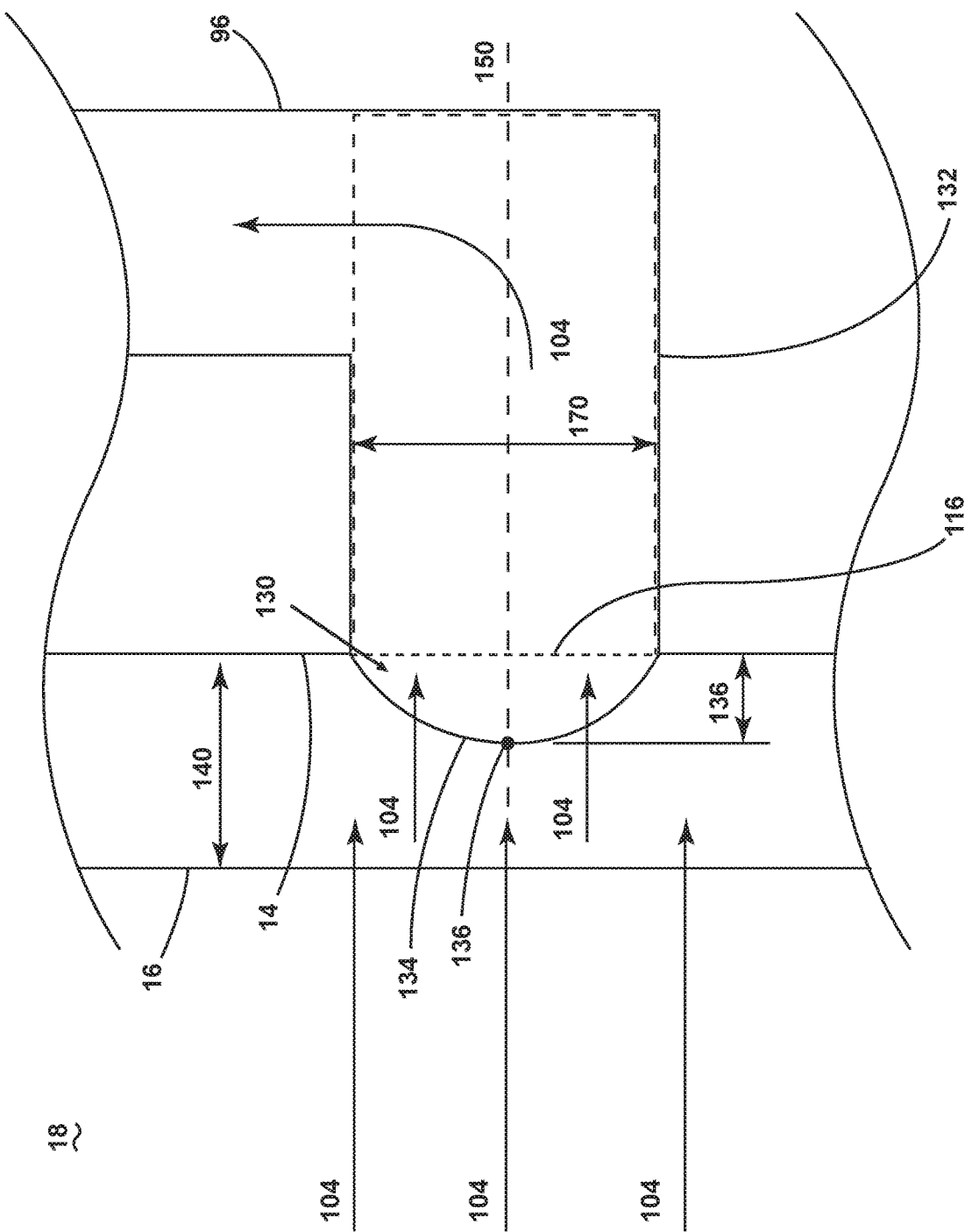
FIG. 3A is a cross-sectional side-view of the filter of FIG. 1 and illustrating the filter closing a drying air duct passing through a tub of the laundry treating appliance of FIG. 1, with the filter having a convex front face.

FIG. 3A is a cross-sectional side-view the filter 130 of the combination washing and drying machine 10 of FIG. 1. The filter 130 can be positioned between the drum 16 and the tub 14 at the inlet 116 of the drying air duct 96. The filter 130 can include a seat portion 132 which can extend into at least a portion of the drying air duct 96 past the inlet 116.

The filter 130 can include a front face 134 which can converge to an apex 136 defined to be along a central longitudinal plane 150 of the filter 130 such that the front face 134 is dome-shaped. The apex 136 of the front face 134 in this case can be defined to be a dome apex. The central longitudinal plane 150 of the filter 130 can be defined to be parallel with the flow of the drying air 104 in the filter 130, and equidistant from the upper, and lower portions of the filter 130. The apex 136 of the filter 130 can be positioned between a gap region 172 between the drum 16 and the tub 14, such that a portion of the filter 130 (e.g., the front face 134) extends upstream the drying air duct 96, and the inlet 116 creating a convex front face 134 with regards to the inlet 116. The dome apex can extend beyond the inlet 116 of the drying air duct 96. As used herein, the term "upstream" can be defined relative to the direction of the drying air 104 entering the inlet 116 of the drying air duct 96 from the treating chamber 18. As used herein, the terms "concave" and "convex" are used to describe the direction the front face 134 of the filter 130 is extending with respect to the inlet 116 of the drying air duct 96. The front face 134 of the filter 130 can, in short, include a convex dome-shaped front face 134.

The front face 134 of the filter 130 can have a larger surface area compared to the cross-sectional area of the inlet 116 of conventional filters. The larger surface area of the front face 134 can allow for a larger amount of lint to be accumulated on the front face 134 of the filter 130, while still leaving a portion of the front face 134 at least partially exposed such that drying air 104 can flow from the treating chamber 18 and into the drying air duct 96.

The inlet 116 of the drying air duct 96, and the seat portion 132 of the filter 130 can both be the same shape, such as, but not limited to cylindrical, triangular, rectangular, or the like. The seat portion 132 can have a smaller cross-sectional area than the cross-sectional area 170 of the inlet 116 such that the seat portion 132 can extend through the inlet 116 and into the drying air duct 96. The seat portion 132 can terminate at any portion of the drying air duct 96. For example, the seat portion 132 can terminate at a rear wall of the drying air duct 96. As shown in FIG. 3A, the seat portion 132 can terminate at a portion of the rear wall of the drying air duct 96 opposing the inlet 116.

Similarly, the front face 134 of the filter 130 can be the same shape as the seat portion 132. Alternatively, the front face 134, and the seat portion 132 can be different shapes such as the ones described herein.

Figure 3B:
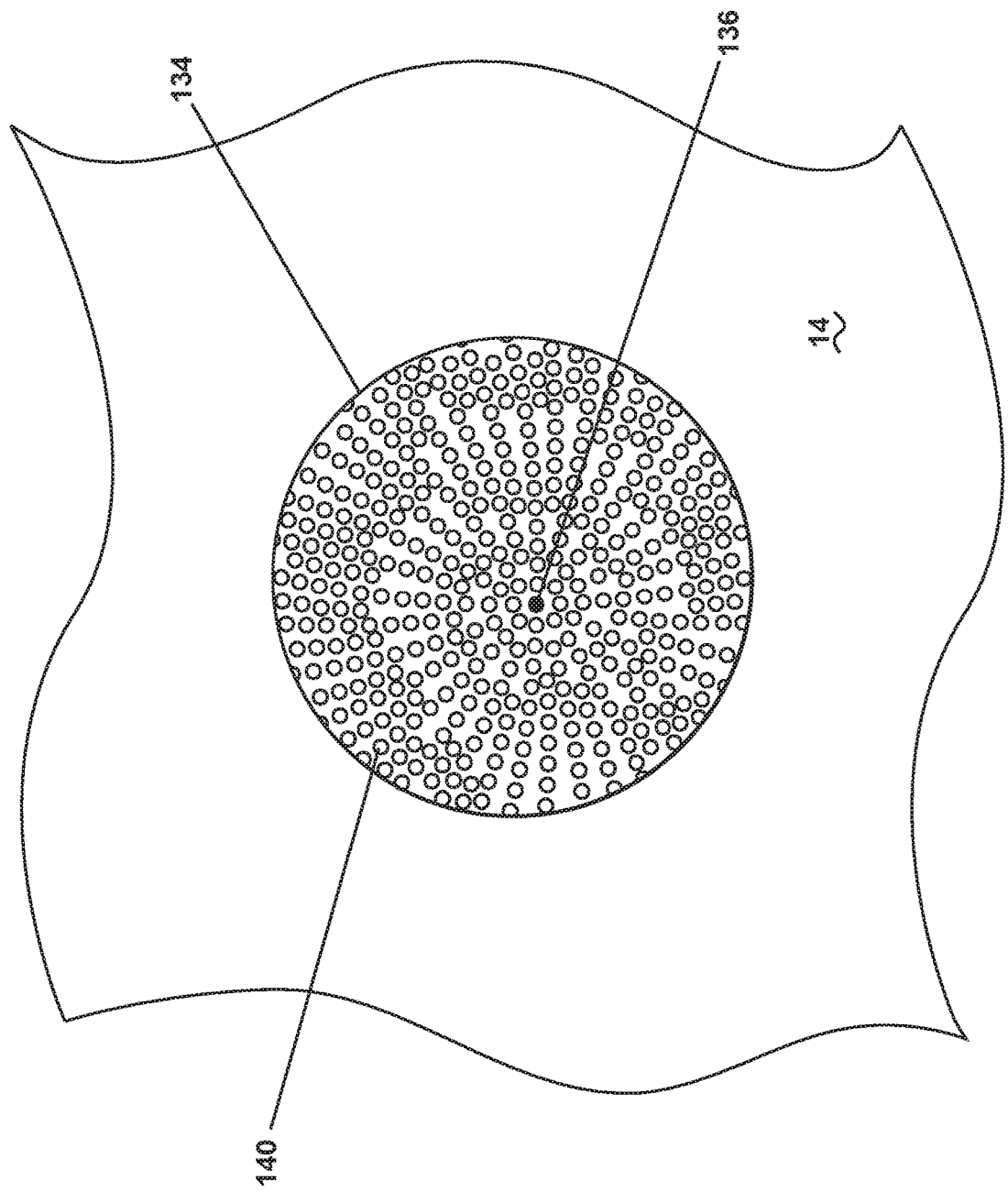
FIG. 3B is a front-view of the filter of FIG. 3A and illustrating a mesh front face for the filter.

FIG. 3B is a front-view of front face 134 of the filter 130 of FIG. 3A. The front face 134 can include a mesh. The mesh can be defined by a plurality of openings 140 which can allow for the drying air 104 to pass from the treating chamber 18 to the drying air duct 96 without lint. The openings 140 as shown in the drawing are not to scale and are for illustration purposes. The size and arrangement of the openings can vary from what is illustrated. The size of the openings 140 can be such that the openings 140 are small enough that lint can impinge against the front face 134 and not pass through the openings 140 and into the drying air duct 96.

As discussed herein, the front face 134 of the filter 130 can have a larger surface area than the cross-sectional area 170 of the inlet 116 which can, in turn, allow for a larger number of openings 140 as opposed to a conventional filter (e.g., a filter with a surface area less than or equal to the cross-sectional area 170 of the inlet 116). The "open area" of the mesh can be thought of as the sum or aggregate area of all of the openings 140. The surface area of the front face 134 can be large enough such that the mesh can have an open area larger than, or equal to, the cross-sectional area 170 of the inlet 116. As there can be a larger surface area of the front face of the filter, there can be a larger number of openings 140, which in turn can create a larger aggerate cross-sectional area of the openings 140, this can allow for a larger rate of flow rate of the drying air 104 through the filter 30 when compared to conventional systems.

During operation of the combination washing and drying machine 10, the filter 130 can become clogged and the drying air 104 can be restricted and the overall efficiency of the combination washing and drying machine 10 can be diminished. In order to optimally function, the combination washing and drying machine 10 may require a needed airflow through the drying air duct 96. The accumulation of lint can negatively affect this needed airflow, as the lint can close off openings to the drying air duct 96. By increasing the aggregate cross-sectional area of the openings 140, and therefore, the filter 130, the drying air 104 can flow through the drying air duct 96 at an overall higher rate, thereby reducing effect of clogging and increasing the overall efficiency of the combination washing and drying machine 10 when compared to conventional systems. As the overall rate of flow with the filter 130 being unclogged can be higher than in conventional systems a portion of the openings 140 can be closed by lint, and the needed airflow through the drying air duct 96 can still be obtained. Additionally, the larger surface area of the front face 134 can allow for a larger amount of lint to be captured without the filter becoming clogged.

As used herein, other non-limiting examples of the filter 130 are presented. Like parts can be identified with like numerals. Variations of existing parts (e.g., an exemplary filter 130) will increase by 100 with each figure.

Figure 4A:
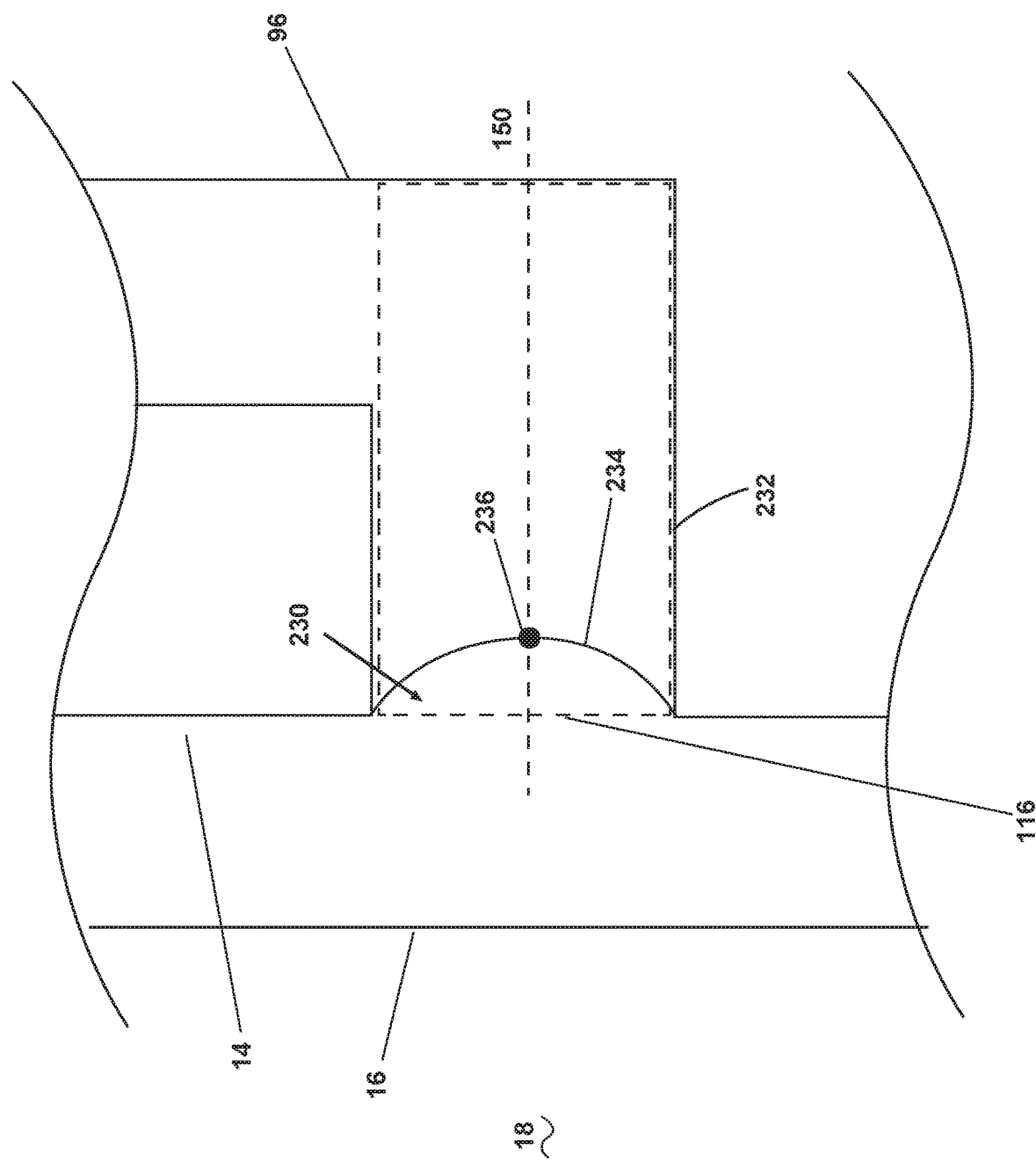
FIG. 4A is a cross-sectional side-view of a variation of the filter of FIG. 3A with a concave front face.

FIG. 4A illustrates a filter 230 with a concave front face 234, the filter 230 including a seat portion 232 and being placed at an inlet 116 of a drying air duct 96 of the combination washing and drying machine 10.

The concave front face 234 of the filter 230 can converge to an apex 236 downstream of the inlet 116 and into the drying air duct 96 such that drying air 104 can flow from a treating chamber 18, through a surface of a drum 16 and towards the inlet 116 formed within a surface of a drum 16. The surfaces of the concave front face 234 can converge to the apex 236 such that the filter has a dome-shaped concave front face 234.

Figure 4B:
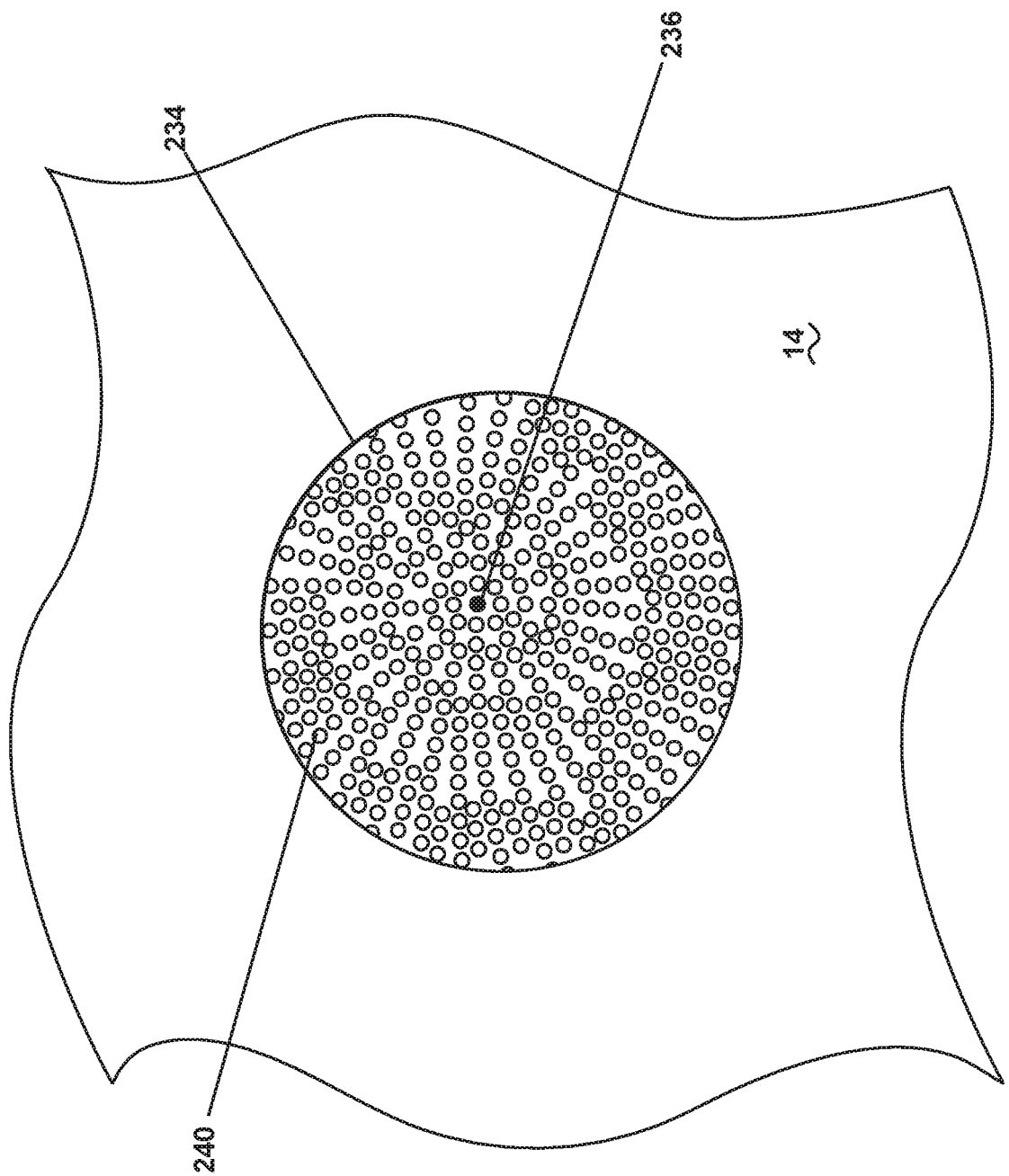
FIG. 4B is a front-view of the filter of FIG. 4A and illustrating a mesh front face for the filter.

FIG. 4B illustrates a front-view of the concave front face 234 of the filter 230 of FIG. 4A formed in a wall of the tub 14. The front face 234 can include a mesh which can be defined by a plurality of openings 240 which can converge to the apex 236.

It will be appreciated that either, or both of the concave, or convex front face 134, 234 can be truncated such that a portion of the front face 134, 234 farthest from the inlet 116 can be flat. The truncated portion can be circular, rectangular, triangular, or the like.

Figure 5A:
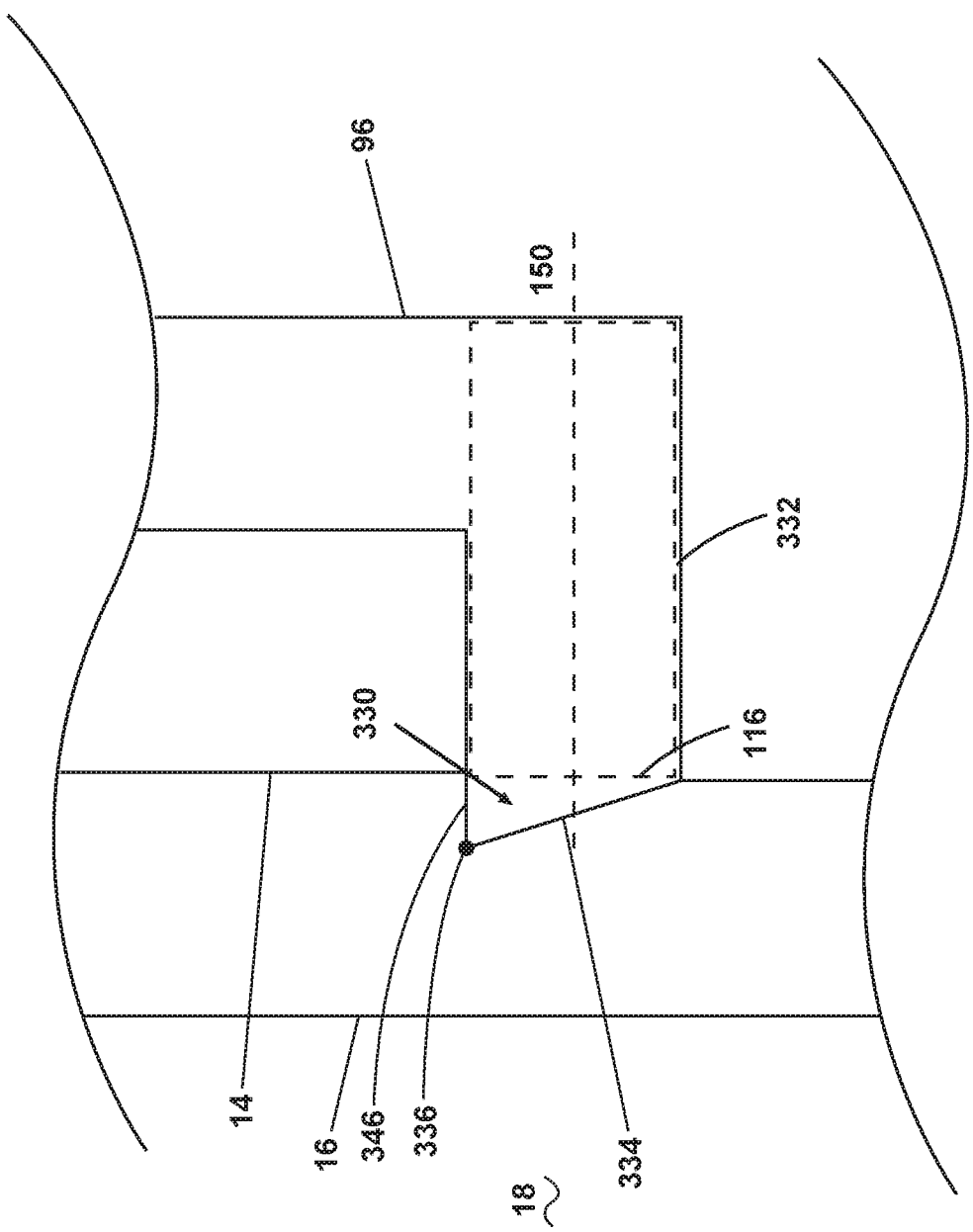
FIG. 5A is a cross-sectional side-view of another variation of the filter of FIG. 3A, with an inclined front face of the laundry treating appliance of FIG. 1.

FIG. 5A illustrates a filter 330 with an inclined front face 334, the filter 330 including a seat portion 332 and being placed at an inlet 116 of a drying air duct 96 of the combination washing and drying machine 10. The filter 330 can include an extended seat portion 346 which can be defined as a section of the seat portion 332 which can extend outward from the inlet 116. There can be openings (not shown) formed on the extended seat portion 346 which can allow the extended seat portion to act in the same manner as the front face 334 of the filter 330.

The inclined front face 334 of the filter 330 can converge to an apex 6136 defined to be a portion of the extended seat portion 346 that can be offset form the central longitudinal plane 150 of the filter 330. In this respect, the inclined front face 334 can be seen as a ramp, or a cone with a non-centered apex. The inclined front face 334 is illustrated to be convex, however, it will be appreciated that it can alternatively be concave.

Although shown to be above the central longitudinal plane 150 of the filter 330, the apex 336 can alternatively be positioned at any location along the front face 334 not along the central longitudinal plane 150.

Figure 5B:
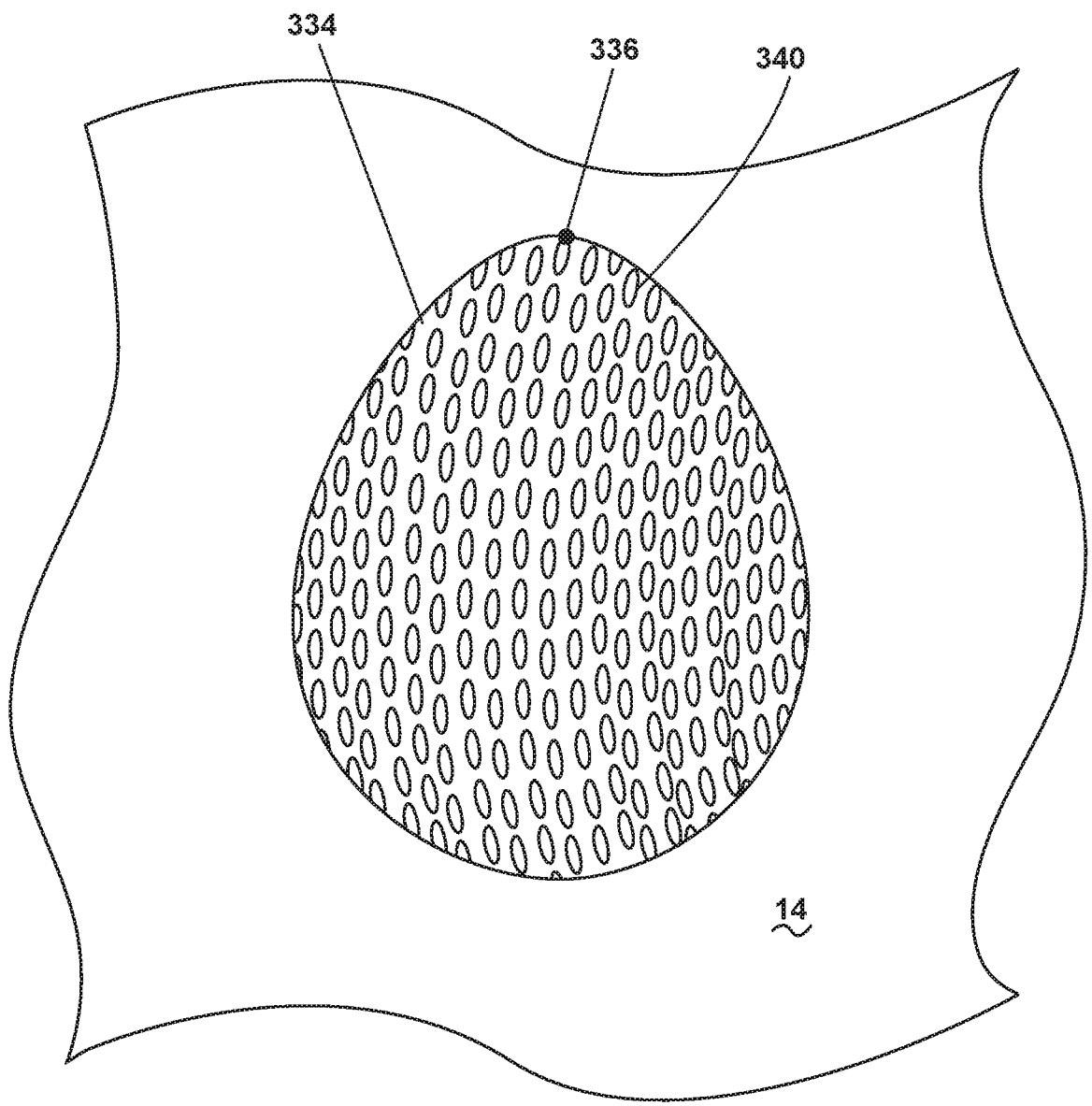
FIG. 5B is a front-view of the filter of FIG. 5A and illustrating a mesh front face for the filter.

FIG. 5B illustrates the inclined front face 334 of the filter 330 of FIG. 5A formed in a wall of the tub 14. The inclined front face 334 further including a mesh with a plurality of openings 340 which can converge to the apex 336.

Figure 6A:
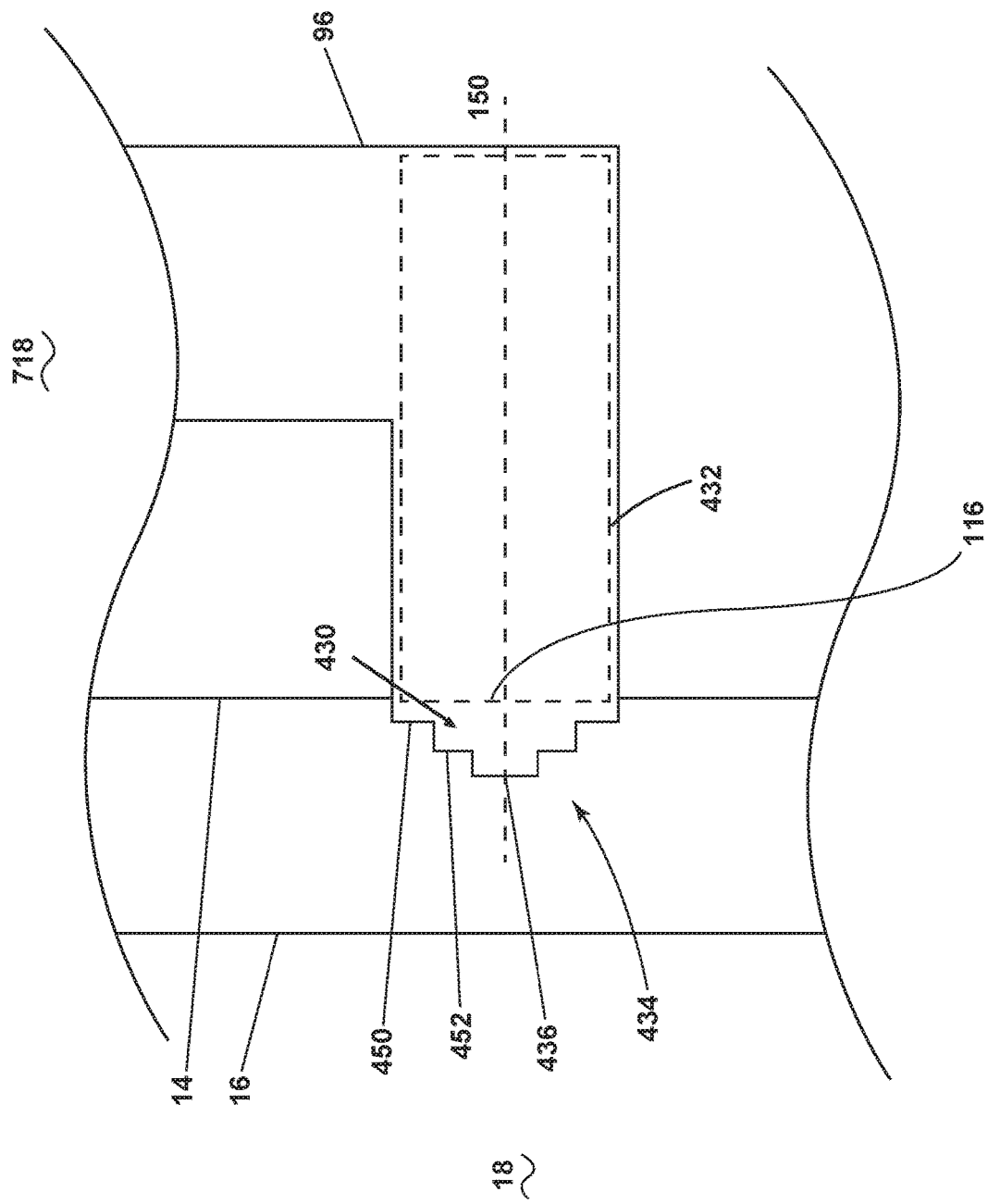
FIG. 6A is a schematic view of another variation of the filter of FIG. 3A, with a stepped front face.

FIG. 6A illustrates a filter 430 with a stepped front face 434, the filter 430 including a seat portion 432 and being placed at an inlet 116 of a drying air duct 96 of the combination washing and drying machine 10. The stepped front face 434 can include a first step 450, a second step 452, and an apex step 436. The apex step 436 can be formed in the center of the stepped front face 434 such that the first and second steps 450, 452 have a constant width around the entire perimeter of the stepped front face 434. The first, second and apex steps 450, 452, 436 can be the same width. Alternatively, one or more of the first, second and apex steps 450, 452, 436 can be differing widths. The apex step 436 can be formed such that the stepped front face 434 can be either convex, or concave.

Figure 6B:
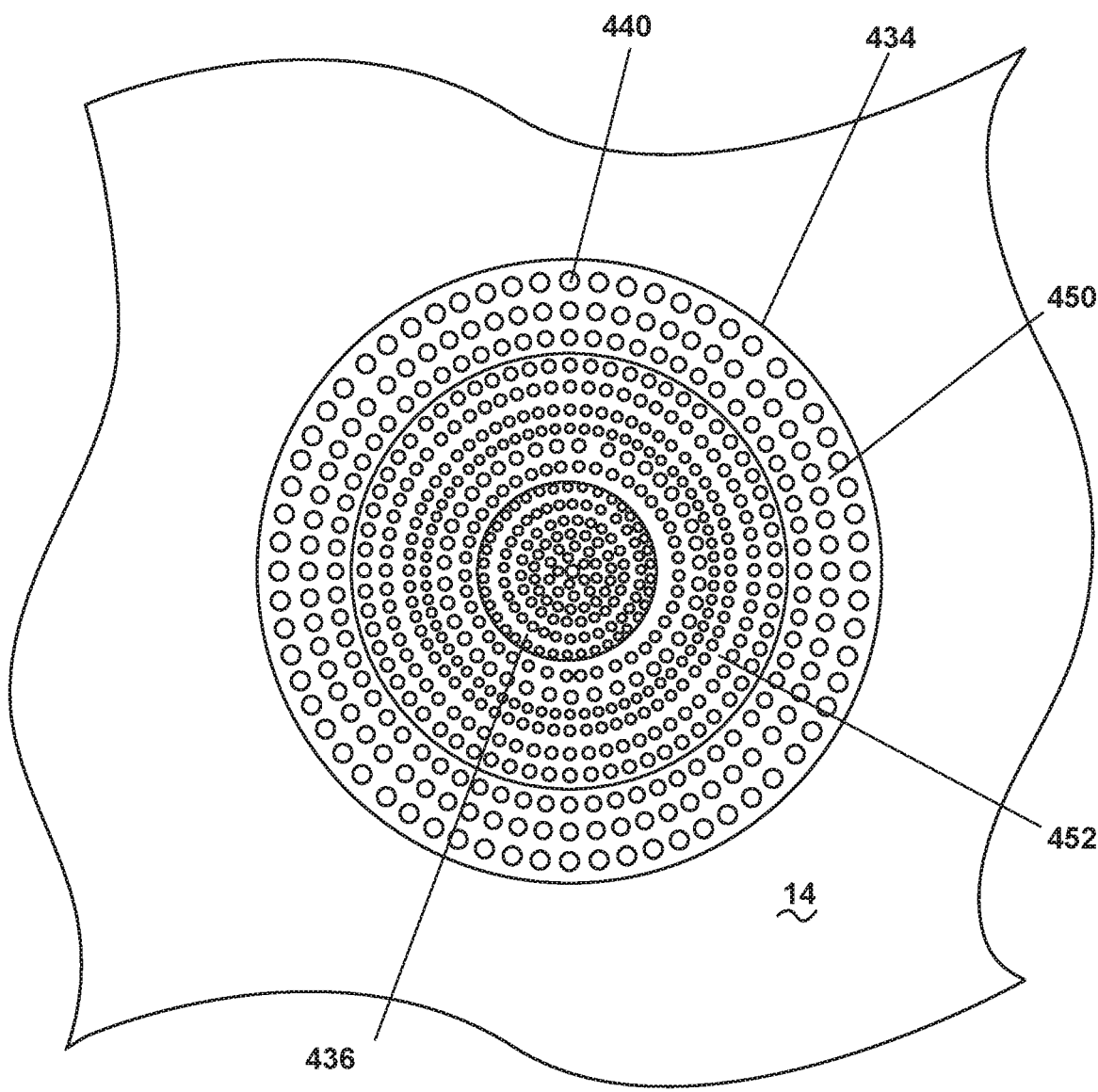
FIG. 6B is a front-view of the filter of FIG. 6A and illustrating a mesh front face for the filter.

FIG. 6B illustrates the stepped front face 434 of the filter 430 of FIG. 6A formed in a wall of the tub 14 including the apex step 436, the first step 450, and the second step 452. Each of the steps 436, 450, 452 can include a plurality of openings 440.

Figure 7A:
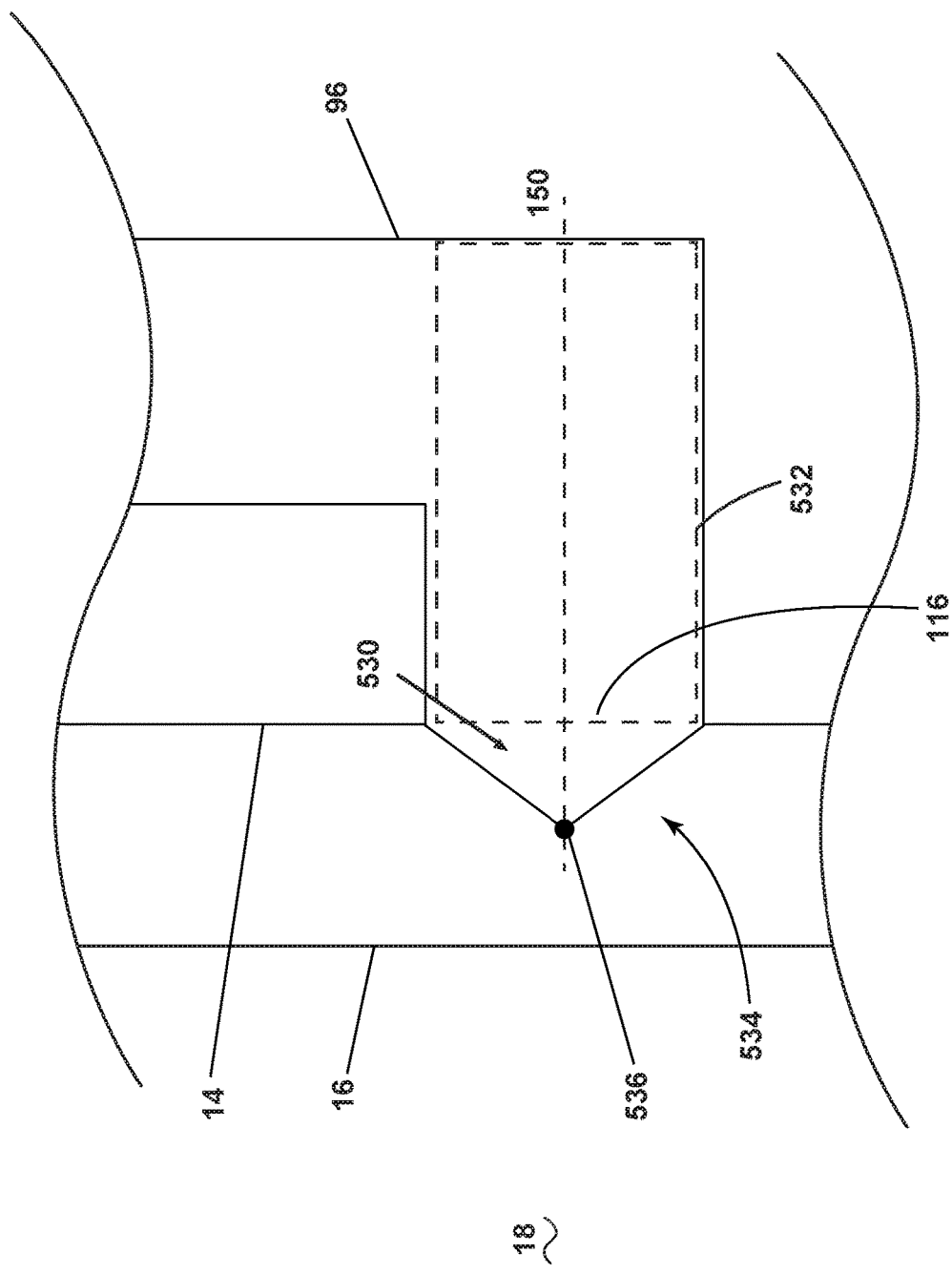
FIG. 7A is a schematic view of another variation of the filter of FIG. 3A, with a connical front face.

FIG. 7A illustrates a filter 530 with a connical front face 534, the filter 430 including a seat portion 432 and being placed at an inlet 116 of a drying air duct 96 of the combination washing and drying machine 10. The conical front face 534 can converge to an apex 536 with a constant slope such that the conical front face 534 can form a cone with an apex 536 located along a central longitudinal plane 150 of the filter 530. The apex 536 can be formed such that the conical front face 534 can be either convex, or concave.

Figure 7B:
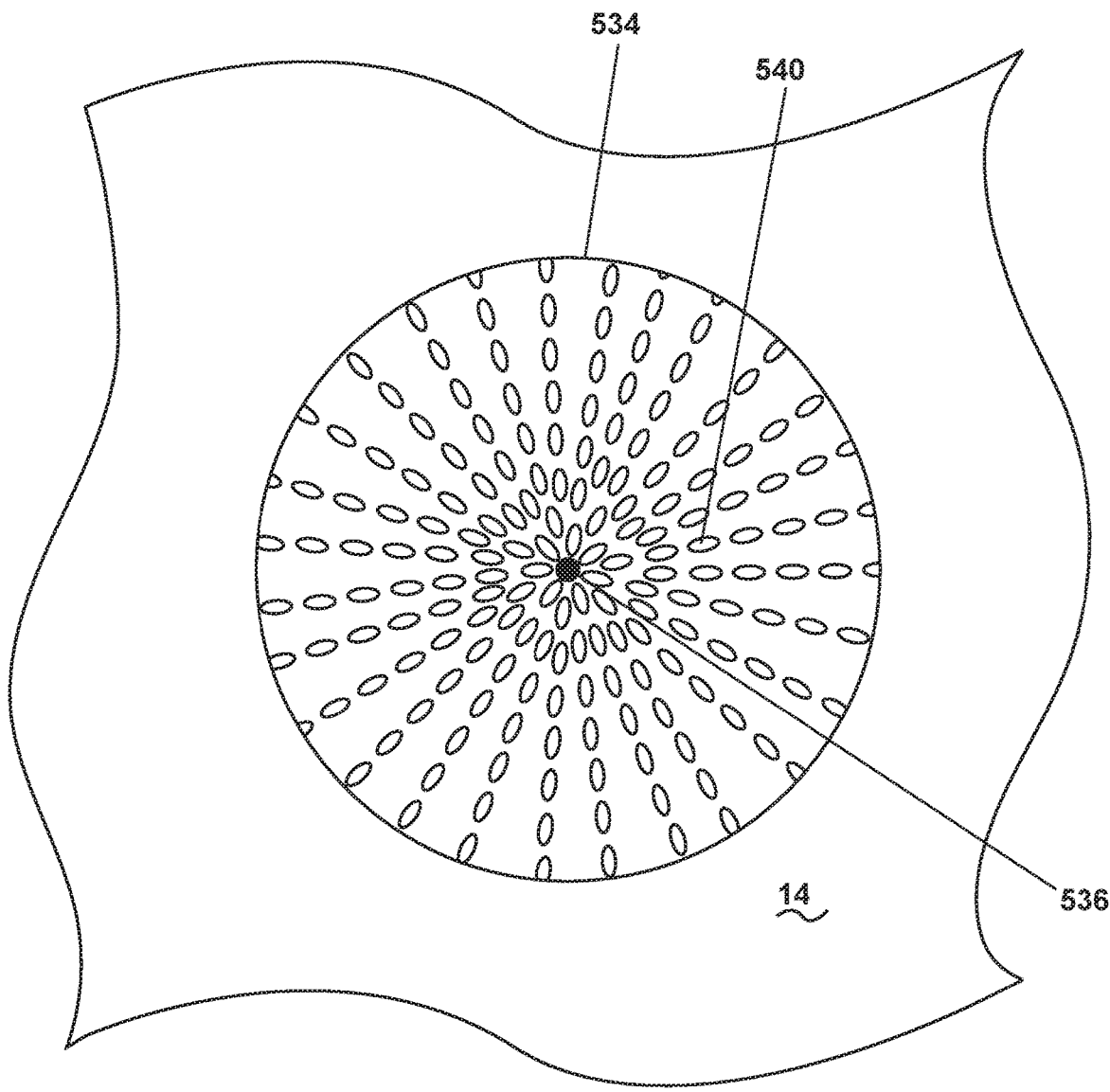
FIG. 7B is a front-view of the filter of FIG. 7A and illustrating a mesh front face for the filter.

FIG. 7B illustrates the conical front face 534 of the filter 530 formed in a wall of the tub 14. The conical front face 534 further including a mesh with a plurality of openings 540 which can converge to respective apexes 536.

Figure 8A:
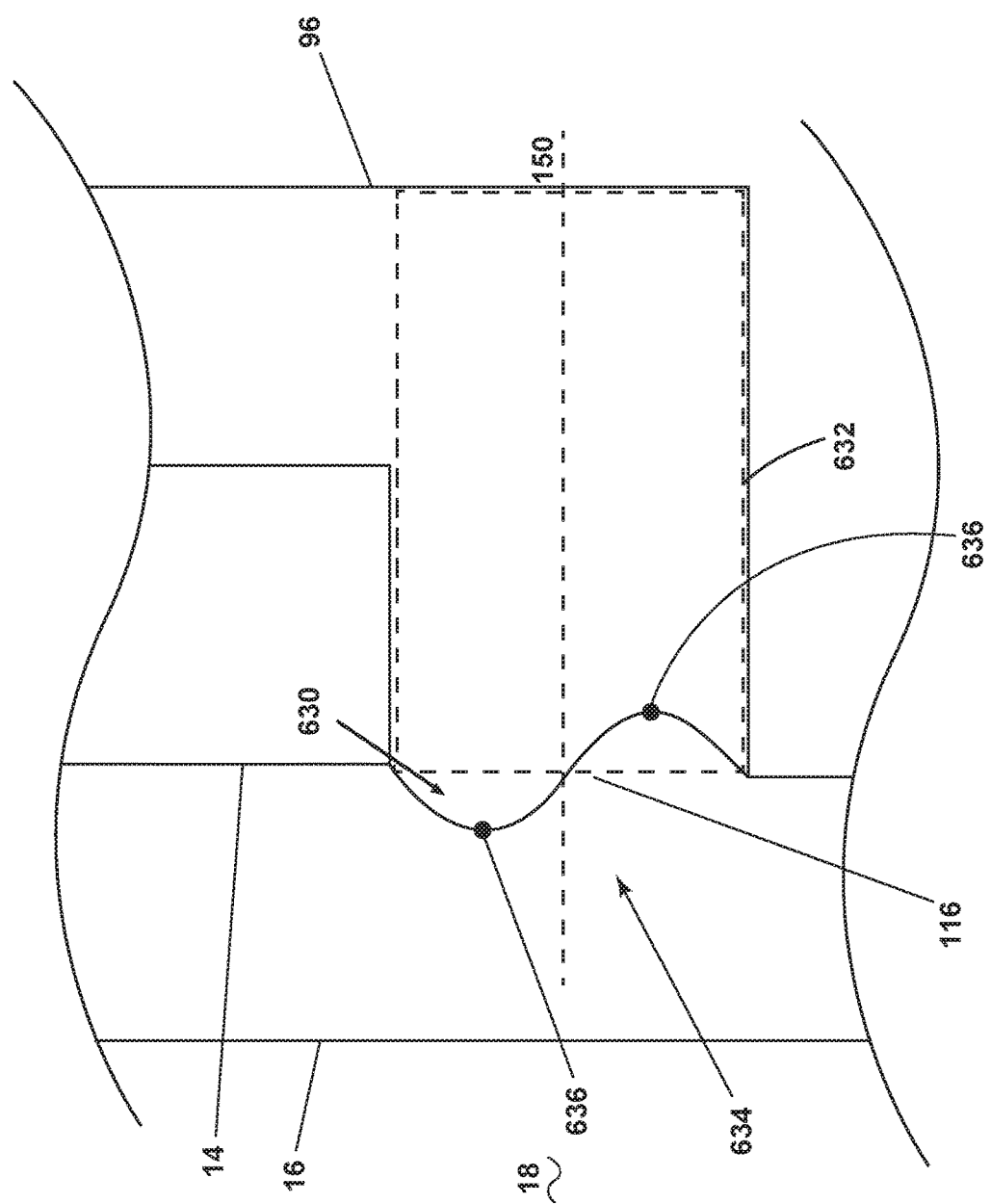
FIG. 8A is a schematic view of another variation of the filter of FIG. 3A, with a sinusoidal front face.

FIG. 8A illustrates a filter 630 with a sinusoidal front face 634, the filter 630 including a seat portion 632 and being placed at an inlet 116 of a drying air duct 96 of the combination washing and drying machine 10. The sinusoidal front face 634 can be formed as a sine wave with two or more apexes 636 formed on either side of the central longitudinal plane 150. Alternatively, one of the two or more apexes 636 can be formed along the central longitudinal plane 150. As illustrated, the sinusoidal front face 634 can include a convex, and a concave portion. It will be appreciated that there can be any number of convex, or concave portions of the sinusoidal front face 634.

Figure 8B:
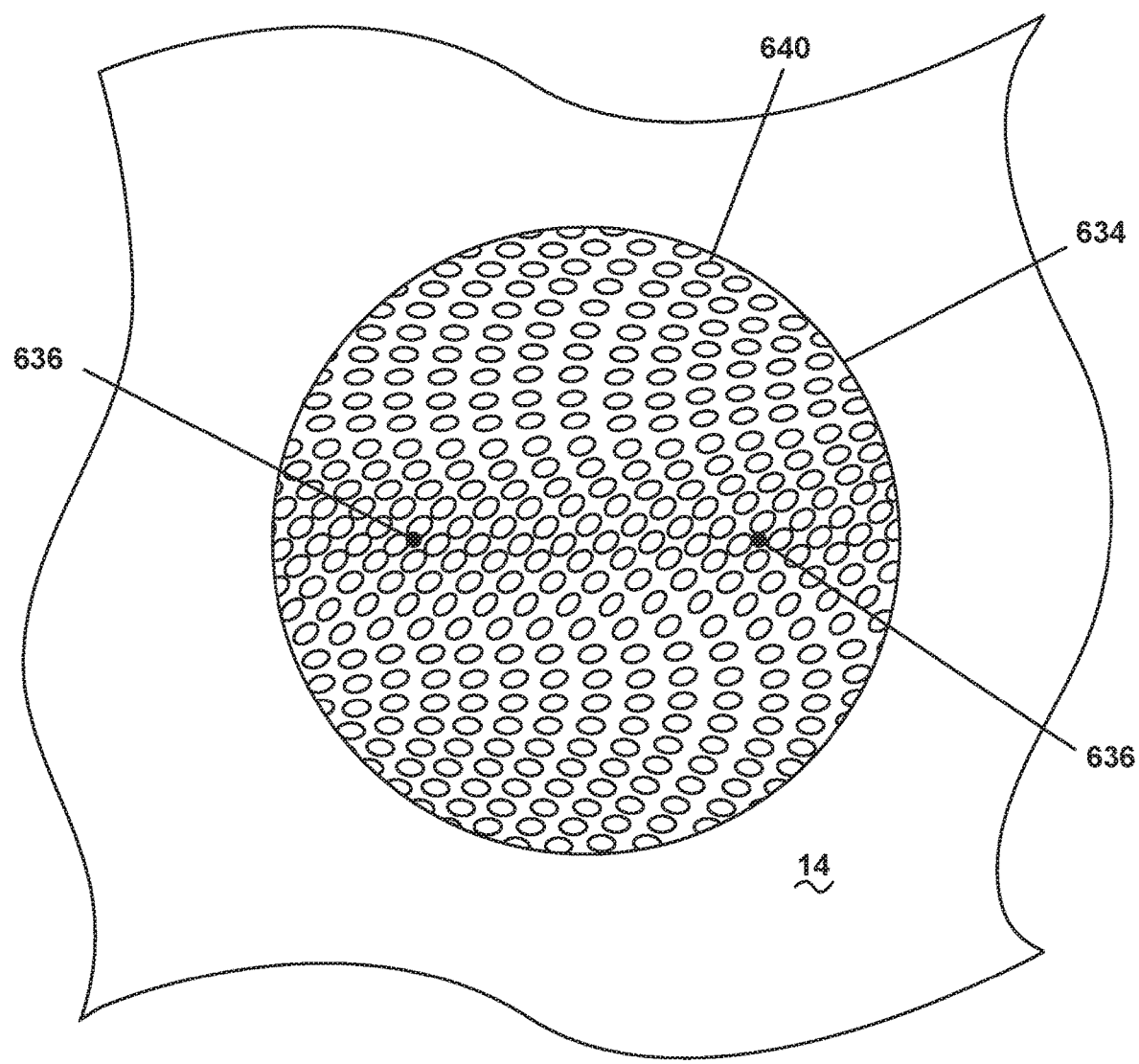
FIG. 8B is a front-view of the filter of FIG. 8A and illustrating a mesh front face for the filter.

FIG. 8B illustrates the sinusoidal front face 634 of the filter 630 of FIG. 8A formed in a wall of the tub 14. The sinusoidal front face 634 further including a mesh with a plurality of openings 640 which can converge to the apex 636.

Figure 9A:
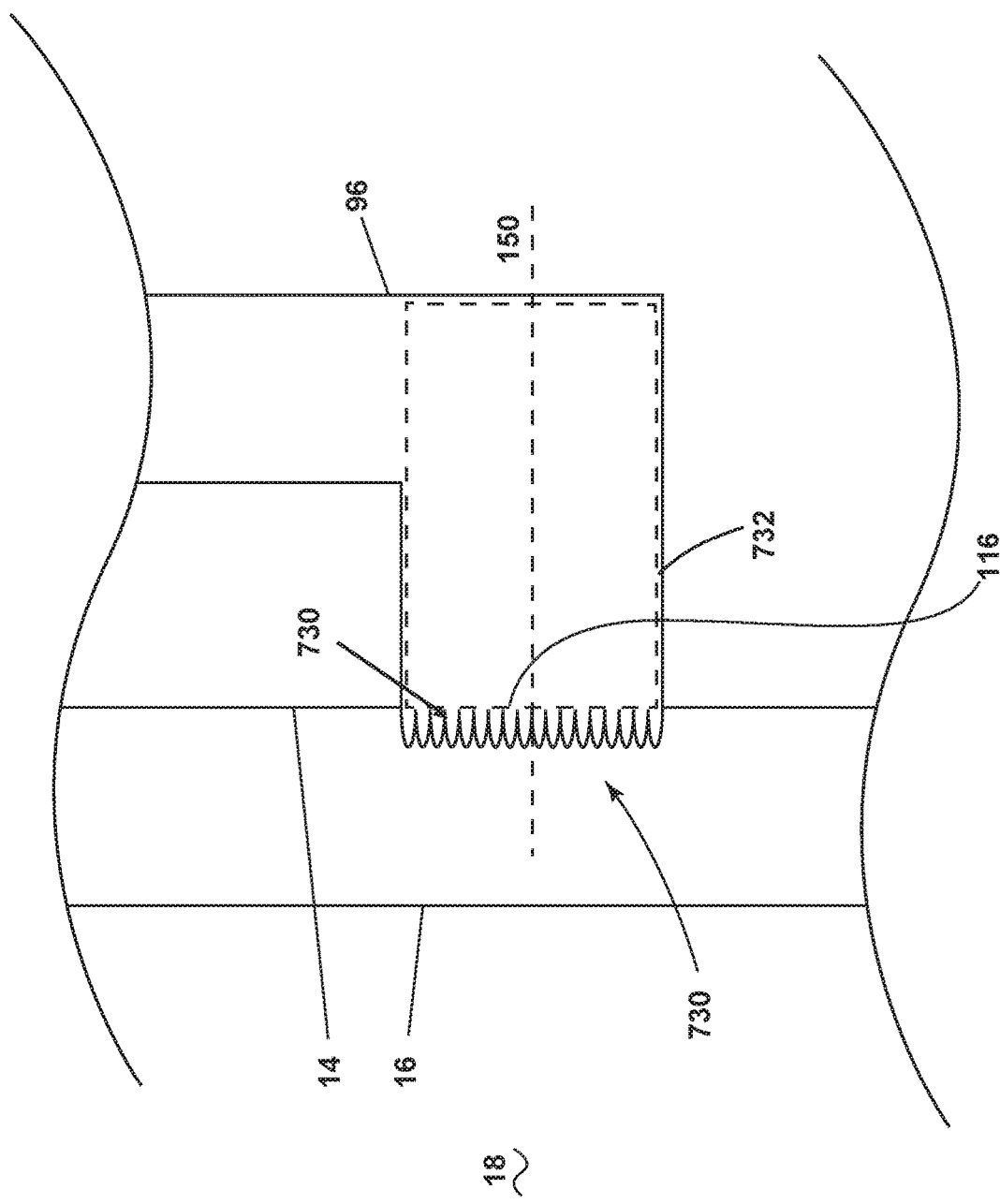
FIG. 9A is a schematic view of another variation of the filter of FIG. 3A with a ribbed front face.

FIG. 9A illustrates a filter 730 with a ribbed front face 734, the filter 730 including a seat portion 732 and being placed at an inlet 116 of a drying air duct 96 of the combination washing and drying machine 10. The ribbed front face 734 can include multiple apexes (not shown) located at the tip of each of the ribs. Each of the ribs can be formed to constantly converge to their respective apexes analogous to any one of the front faces 134-634 described herein. One or more of the ribs can converge to their respective apexes in a different fashion than another rib. For example, a first rib can extend to a first apex in accordance with conical front face 534, a second rib can extend to a second apex in accordance with front face 134, and a third rib can extend to a third apex as a rectangular projection.

Each of the ribs can extend along the entire width of the ribbed front face 734. Alternatively, each of the ribs can be seen as "bumps" along the front face 734 such that there are bumps formed at various locations along the entire ribbed front face 734. The ribs, or bumps, can either be convex, concave, or a combination thereof.

Figure 9B:
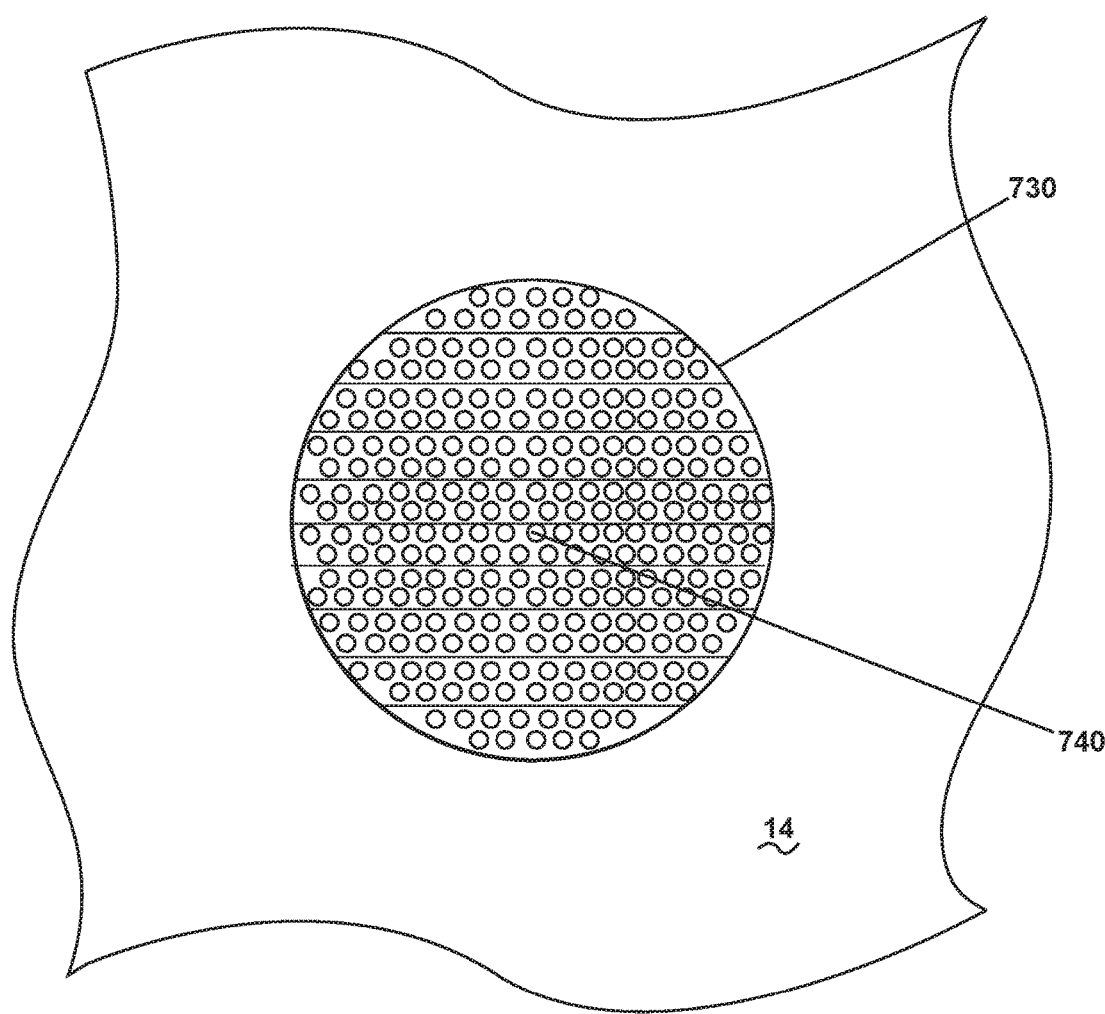
FIG. 9B is a front-view of the filter of FIG. 9A and illustrating a mesh front face for the filter.

FIG. 9B illustrates the ribbed front face 734 of the filter 730 of FIG. 9A formed in a wall of the tub 14. In this example, the ribs of the ribbed front face 734 extend horizontally across the entirety of the front face 734 with a plurality of openings 740 formed therein. It will be appreciated that these horizontal ribs are not limited to their current orientation. For example, the ribs could run diagonally, or vertically across the ribbed front face 734. Alternatively, one or more of the ribs can have different orientations such that one rib runs vertical, and the other runs horizontal. In this case, the ribs can intersect at a common point. It will be appreciated that many variations exist.

Figure 9C:
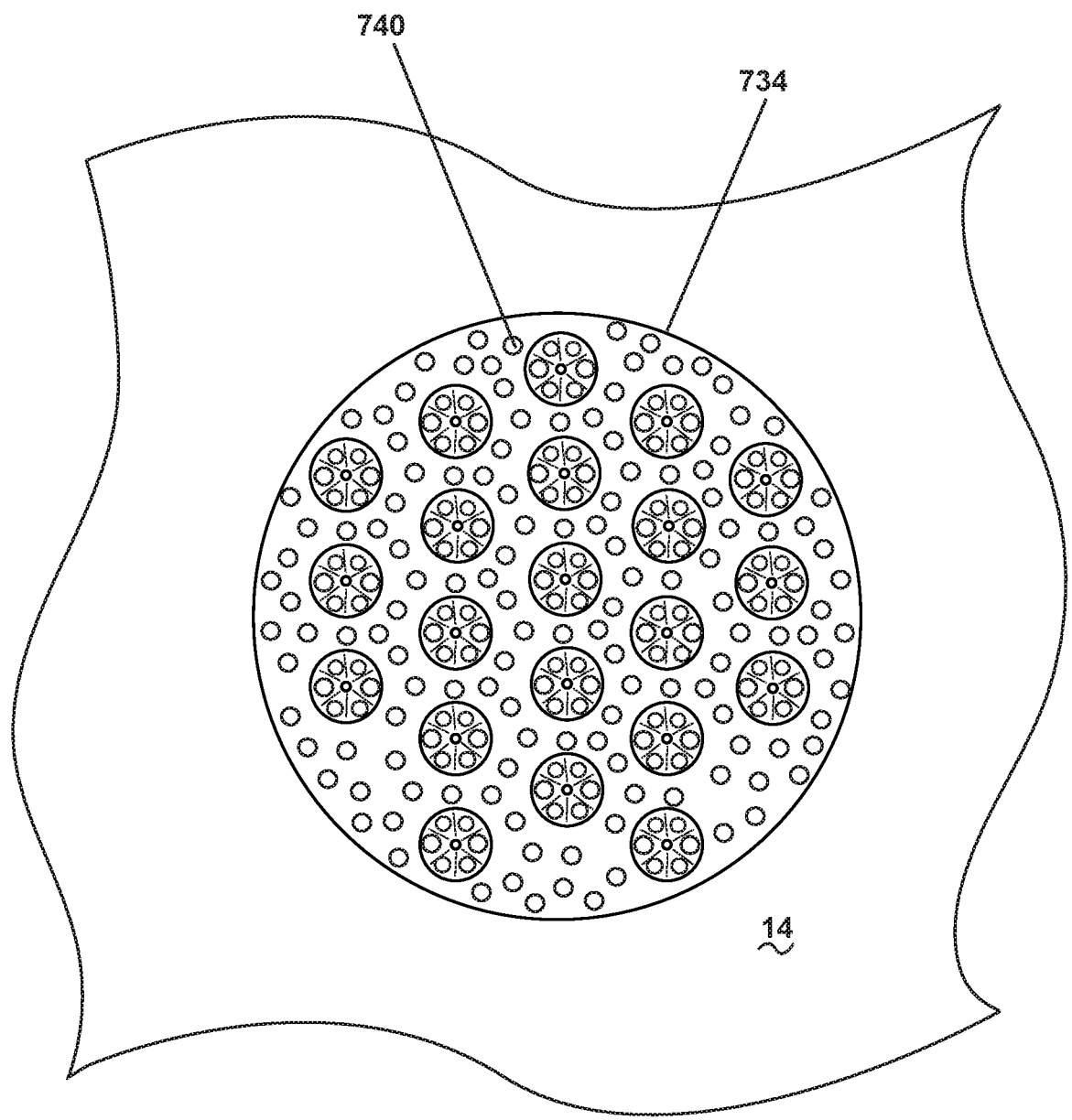
FIG. 9C is another front-view of the filter of FIG. 9A and illustrating a mesh front face for the filter.

FIG. 9C illustrates the ribbed front face 734 of the filter 730 of FIG. 9A formed in a wall of the tub 14. In this example, the ribs of the ribbed front face 734 are formed as dimples, or bumps described herein. The ribbed front face 734 can further include a plurality of openings 740 formed within the dimples, or bumps. Alternatively, one or more of the openings 740 can be formed in between the dimples, or bumps.

In all of the drawings of the different openings (140, 240, 340, 440, 540, 640, 740), the openings are not drawn to scale. The size, shape and the arrangement of the openings can vary from what is shown. Specifically, to the "open area" of the mesh, to illustrate the openings in a way they can be viewed in the drawings, it may not be possible to illustrate the percentage of open area as disclosed in the text. However, it should be understood that the size, shape and arrangement of the openings can be selected to provide the stated open area.

As disclosed herein, the filters (130, 230, 330, 430, 530, 630, 730) can include front faces (134, 234, 334, 434, 534, 634, 734) with corresponding openings ((140, 240, 340, 440, 540, 640, 740). The surface area of the front faces can be formed such that they have a surface area greater than the cross-sectional area of the inlet 116. For example, the surface area of the front faces can be between 1% to 1700% larger than the cross-sectional area of the inlet 116. The size of the openings can be between 100 to 1500 microns, and be sized, or arranged such that the openings define the aggregate cross-sectional area which can fall between 30% to 75% of the total surface area of the front face.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure.

The invention claimed is:

1. A combination washer/dryer comprising:
   a tub defining a tub interior with a tub access opening;
   a rotatable drum located within the tub interior and defining a treating chamber with a treating chamber access opening;
   a drying air duct having an inlet formed in the tub, the inlet defining a cross-sectional area; and
   a filter having a front face, the front face defining a plurality of openings collectively defining an aggregate opening area, the front face overlying the inlet and having a surface area greater than the cross-sectional area of the inlet, wherein the aggregate opening area of the front face is equal to or greater than the cross-sectional area of the inlet, the filter further comprising a seat portion extending past the inlet into the drying air duct and terminating at a portion of a rear wall of the drying air duct opposing the inlet and spaced from the tub.

2. The combination washer/dryer of claim 1, wherein the front face of the filter comprises a mesh.

3. The combination washer/dryer of claim 2, wherein the openings are 1500 microns or smaller.

4. The combination washer/dryer of claim 1, wherein the front face of the filter is dome-shaped defining a dome apex.

5. The combination washer/dryer of claim 4, wherein the dome apex is located exteriorly of the drying air duct.

6. The combination washer/dryer of claim 5, wherein the dome apex is spaced from the drum.

7. The combination washer/dryer of claim 1, wherein the front face of the filter is convex.

8. The combination washer/dryer of claim 7, wherein at least a portion of the front face of the filter lies exteriorly of the drying air duct.

9. The combination washer/dryer of claim 1, wherein the inlet and the seat portion comprise the same shape.

10. The combination washer/dryer of claim 1, wherein the seat portion has a smaller cross-sectional area than the cross-sectional area of the inlet.

11. The combination washer/dryer of claim 1, wherein the seat portion defines openings therethrough.

* * * * *